(12) United States Patent
Choi et al.

(10) Patent No.: US 6,701,989 B2
(45) Date of Patent: Mar. 9, 2004

(54) RADIAL TIRE FOR AUTOMOBILE

(75) Inventors: Soo-myung Choi, Anyang-si (KR); Cheol Kim, Anyang-si (KR)

(73) Assignee: Hyosung Corporation, Seoul (KR)

( * ) Notice: Subject to any disclaimer, the term of this patent is extended or adjusted under 35 U.S.C. 154(b) by 194 days.

(21) Appl. No.: 10/116,752

(22) Filed: Apr. 5, 2002

(65) Prior Publication Data

US 2002/0195185 A1 Dec. 26, 2002

(30) Foreign Application Priority Data

Apr. 11, 2001 (KR) .................................. 2001-19292

(51) Int. Cl.[7] .............................. B60C 9/00; B60C 9/08; D02G 3/48
(52) U.S. Cl. .................... 152/556; 152/451; 428/393
(58) Field of Search ............................... 152/556, 451; 428/393

(56) References Cited

U.S. PATENT DOCUMENTS 6,013,367 A * 1/2000 Nakagawa et al. ......... 428/393
6,361,862 B1 * 3/2002 Kim et al. .................. 428/393

* cited by examiner

*Primary Examiner*—Adrienne C. Johnstone
(74) *Attorney, Agent, or Firm*—Nath & Associates PLLC; Gary M. Nath

(57) ABSTRACT

Disclosed is a radial tire for an automobile, in which lyocell having a dry/wet tenacity ratio S1/S2 of 1.2 to 1.6, a tensile strength at high temperature/a tensile strength at room temperature ratio S3/S4 of more than 0.8, and a shrinkage E of less than 0.01 is applied to a carcass part, thereby a resistance to fatigue and dimensional stability in running of a tire are improved.

3 Claims, 1 Drawing Sheet

RADIAL TIRE FOR AUTOMOBILE

BACKGROUND OF THE INVENTION

1. Field of the Invention

The present invention relates, in general, to a radial tire for an automobile, in which a lyocell cord with excellent dimensional stability at high temperatures and dry/wet tenacity ratio is applied to a carcass ply and, in particular, to a radial tire for an automobile, in which a fatigue resistance and dimensional stability are improved by applying the lyocell cord to a radial tire with low aspect ratio. The term "lyocell" means a cellulose fiber, which has a much higher wet tenacity than viscose rayon.

2. Description of the Prior Art

A traditional radial tire comprises a carcass ply in which rubber is reinforced by fiber cords such as polyester, rayon, or aramid, a belt in which rubber is reinforced by steel cords, and a bead wire.

The bead wire for preventing the tire from bead unseating problem and maintaining structural integrity is positioned at a junction between the tire and the rim, and plays a role of fixing the carcass ply.

Originally, a pneumatic tire comprises cotton canvas cloth as a carcass ply, and later synthetic fiber cords such as rayon, nylon, and polyester were used as the carcass ply with the development of synthetic fibers.

The pneumatic radial tire, in particular, the pneumatic radial tire with an aspect ratio of 0.65 to 0.82, uses polyester as the carcass ply. On the other hand, rayon carcass ply is preferred when the pneumatic radial tire for high-speed driving has a low aspect ratio.

Recently, polyester is applied to the radial tire for high-speed driving with the low aspect ratio, however, the application is restricted because polyester has poorer thermal properties and dimensional stability than rayon.

Meanwhile, rayon has disadvantages in terms of its physical properties and production process, so that rayon is also limitedly applied to radial tires.

In other words, rayon is produced by use of an indirect substitution process, which is complicated and not environmentally friendly, so that the process has an disadvantage in view of recent tendency of attaching importance to protection of the environment. In addition, rayon cords are not suitable to use as the tire cord because its wet strength is too low, and the tenacity of the tire is reduced owing to the moisture penetrated into the tire through a crack or wound in the tire's tread during use of the tire, so that durability of the tire is reduced. Also, a moisture regain should be controlled to 2% or lower during production of the tire.

Therefore, a tire using rayon carcass has been limitedly used even though rayon has excellent thermal properties and dimensional stability.

SUMMARY OF THE INVENTION

Therefore, it is an object of the present invention to provide a radial tire for an automobile having an improved fatigue resistance and structural integrity and low aspect ratio, by using a lyocell cord with excellent physical properties, dimensional stability and dry tenacity/wet tenacity ratio as a material of a carcass ply of a pneumatic radial tire.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
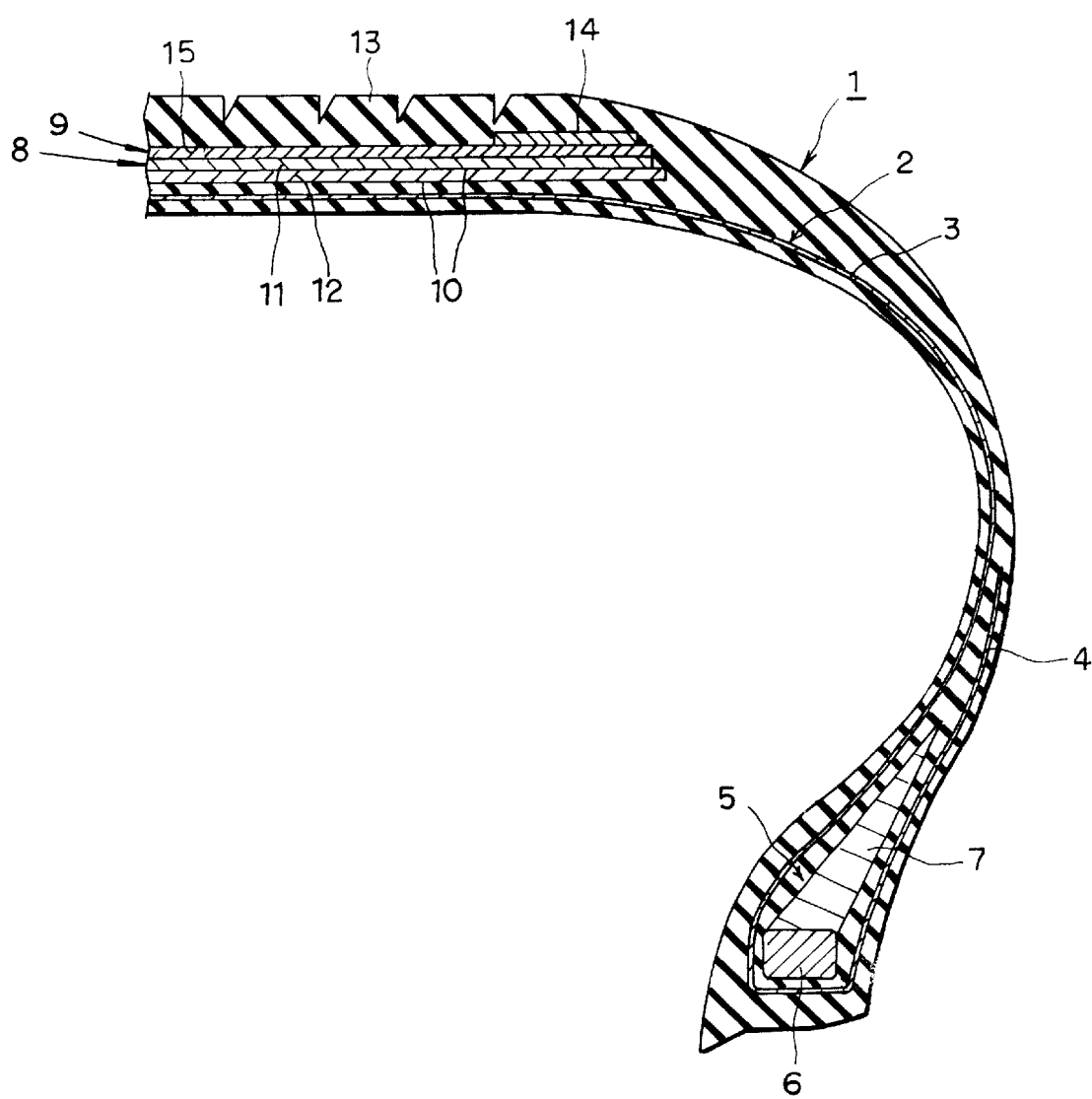
FIG. 1 is a schematic illustration of a tire according to the present invention.

The present invention provides a tire 1 using lyocell cord with a high dry tenacity S1/wet tenacity S2 ratio and excellent dimensional stability at high temperature as a tire cord 3 for reinforcing a carcass ply of the tire 1, as shown in FIG. 1.

At this time, it is preferable that S1 ranges from 4.0 to 5.5 g/d, S2 from 3.0 to 4.5 g/d, and S1/S2 ratio from 1.2 to 1.6, wherein S1 is a tenacity of the lyocell measured under conditions of a crosshead speed of 300 mm/min and a pre-tension of 0.05 g/d with the use of a cord grip after the lyocell is dried at 107° C. for 2 hours, and S2 is a tenacity of the lyocell measured under the same condition as the S1 after the lyocell is left at 25° C. and 65 RH for 24 hours.

For example, when S1 is less than 4.0 g/d, the lyocell cannot sufficiently reinforce the tire. On the other hand, the lyocell cannot have S1 more than 5.5 g/d because upper limit tenacity of the lyocell is 5.5 g/d at present. In addition, an S1/S2 ratio of less than 1.2 cannot be practically obtained because the wet tenacity is more than 90% of the dry tenacity. On the other hand, when the S1/S2 ratio is more than 1.6, it is disadvantageous to produce the tire because the wet tenacity is too low.

As for rayon, the S1/S2 ratio is generally 2.0 or higher, and thus it should be strictly controlled so that a moisture content is 2% or less during production of the tire. If the moisture content is not strictly controlled, the tenacity of a radial tire does not reach a standard. Furthermore, the tenacity of the tire is reduced owing to the moisture penetrated into the tire through a crack or wound in the tire's surface during use of the tire, and rayon tires may be deformed because the tenacity reduction of rayon tires is larger than that of lyocell tires, so that a tire's shape is deformed and a fatigue resistance is reduced during use of the tire.

Directed to the structural integrity of the tire at high temperature, it is preferable that a tensile strength S3 at high temperature is 80% or more of the tensile strength S4 at room temperature, and a shrinkage E is less than 1%. At this time, S3 is measured at 140° C., S4 is measured at 25° C. under the moisture regain of 1% or lower, and remaining conditions are the same as for S1. Also, it is preferable to measure E after the lyocell tire is left at 177° C. under condition of pre-tension of 0.01 g/d for 2 min.

Conventional polyester yarn for polyester tire cord has a S3/S4 ratio of 0.75 or lower and a shrinkage of 1% or higher. The polyester yarn is limitedly applied in a tire for high-speed driving with the aspect ratio of 0.6 or lower because S3 is low, and in many cases, a process for expanding the tire after vulcanization (PCI) is indispensable during production of the tire with the use of the polyester yarn because E is 2.5 or higher.

According to the present invention, however, a process for expanding the tire after vulcanization (PCI), which is necessary to produce the tire by use of polyester cord, can be omitted during production of the tire by applying the lyocell cord, in which the S1/S2 ratio ranges from 1.2 to 1.6 and S3 is 80% or higher of S4, into the radial tire with low aspect ratio.

Additionally, when applying the tire cord 3 for carcass ply to a tire, the bonding force between the tire cord 3 and the tire will be large enough to allow the bonding process using a resorcinol-formaldehyde-latex (RFL) adhesive to be conducted in one stage.

The process for expanding the tire after vulcanization (PCI) is generally conducted before a final inspection process during production of the tire, in which hot water, or steam, or inert gas such as nitrogen is inserted through a bladder, i.e. rubber elastic body, into a green tire under a predetermined pressure in a tire mold, then the green tire is left at 170 to 180° C. for 10 to 15 min to crosslink sulfur and rubber molecules in unvulcanized rubber, and the tire is separated from the mold, followed by air is blown into the tire for 10 to 20 min, thereby a shape variation of the tire due to elasticity recovery and a shrinkage of the tire cord in the tire owing to rapid temperature change can be prevented.

Generally, air is blown into the tire under 2 kg/cm$^2$ or higher. The bladder consists of butyl rubber, and the green tire is an unvulcanized rubber structure in which rubber, the tire cord, bead wire, and steel cord are reinforced and laminated.

In case polyester tire cord is used, the process for expanding the tire after vulcanization (PCI) is indispensable because the polyester tire cord has a larger heat shrinkage than the rayon tire cord and the lyocell tire cord.

Preferably, the carcass cord 3 using lyocell has a total denier of 3000 to 5500 d, a density of 15 to 30 EPI, and the twist number of 10 to 15 tpi, and more preferably, the twist number of 10 to 12 tpi and the denier of 3300 d.

Herein, the term "maximum section height CH of a tire" is defined as a radial length from a nominal rim diameter of the tire to a radially outermost part of the tread part in the tire. The nominal rim diameter is a diameter of the tire indicated by size of the tire.

A maximum section width of the tire is a maximum linear distance between the outside of the sidewalls of an inflated tire, excluding embellishments due to labeling (marking), decorations, or protective bands or ribs, which is measured without load after the tire is expanded under normal pressure for 24 hours.

The regular pressure is the recommended inflated pressure and load set by a Korean Standards Association or related Association when the tire is used in a specific type of service.

A better understanding of the present invention may be obtained in light of the following examples which are set forth to illustrate, but are not to be construed to limit the present invention.

Polyester cord (comparative example 1), conventional rayon cord (comparative example 2), and lyocell cord of the present invention (example) were applied to the tire, and measured in tenacities and shrinkage under various conditions. Results are described in Table 1.

TABLE 1

| | Material | S1/S2 | S3/S4 | E(%) | Note |
|---|---|---|---|---|---|
| Co. Ex. 1 | Polyester | 1.0–1.2 | ≦0.75 | 2.5≦ | Dimensional stability and physical properties at high temperature are poor when the tire with a low aspect ratio is used because S3/S4 is low |
| Co. Ex. 2 | Rayon | 1.8≦ | ≦0.80 | ≦1.0 | workability and durability of the tire are poor because S1/S2 is high |

TABLE 1-continued

| | Material | S1/S2 | S3/S4 | E(%) | Note |
|---|---|---|---|---|---|
| Exam. | Lyocell | 1.2–1.6 | 0.80≦ | <1.0 | Durability, uniformity, and dimensional stability of the tire are improved |

* S1, S2 was measured by universal testing machine, with C-type cord grip. Crosshead speed was 300 mm/min. Gauge length was 250 mm. S1 was measured after drying for 2 hrs at 107° C., S2 was measured after being conditioned 24 hrs at 25° C., 65% R.H.

The same machine, with environmental chamber, measured S3 and S4. S3 was measured at 140° C. Specimens should be treated 4 minutes at 140° C. being clamped by C-type cord grip, before measuring S3. Gauge length of S3 and S4 were 500 mm, while crosshead speed was 300 mm/min. S4 was measured at 25° C., after being conditioned 24 hrs at 25° C., 65% R.H.

E: a shrinkage measured after material is left for 2 min under the condition of pre-tension of 0.01 g/d at 177° C.

EXAMPLE

A carcass ply 2 in a radial tire of the present invention shown in FIG. 1 comprises at least one layer of tire cord 3 for reinforcing the carcass ply. Referring to FIG. 1, the carcass ply 2 having a radial direction exterior ply turn-up 4 is illustrated, and preferably the carcass ply 2 comprises one to two layers of carcass cords.

The tire cord 3 for reinforcing the carcass ply is oriented such that the tire cord 3 forms an angle of 85 to 90° to the equator plane of tire 1. In FIG. 1, the tire cord 3 is arranged at right angles to the equator plane of tire 1.

The tire cord 3 consists of lyocell with excellent structural integrity at high temperature and dry tenacity/wet tenacity ratio.

It is preferable that the ply turn-up 4 has a height of 30 to 80% against a maximum sectional height (CH) of the tire. For example, when the ply turn-up is lower than 30%, rigidity supplementary effect of the tire's side wall is too low. On the other hand, when the ply turn-up is more than 80%, the rigidity of the tire's side wall is too high, so that driving comfort is poor.

A bead portion 5 of the tire 1 has a non-elongation bead core 6, as shown in FIG. 1. It is preferable that the bead core 6 is made of continuously wound monofilament steel wire.

In a preferred embodiment, the high strength steel ranges in diameter from 0.95 to 1.00 mm, forming a 4×4 structure. Also, a 4×5 structure may be allowed.

The bead portion has a bead filler 7 whose hardness is above average, and preferably shore A hardness of 40 or more.

According to the present invention, a crown part of the tire 1 is reinforced by a structure of a belt 8 and a cap ply 9.

The belt 8 comprises two cut belt plies 10, and cords 11 of the belt ply are oriented such that cords 11 form an angle of about 20° to the equator plane of tire 1, as shown in FIG. 1.

Cords 11 of the belt ply are arranged against the equator plane of tire 1, being in an opposite direction to another cord 12.

The belt 8 may comprise any number of plies, and the cords are arranged at an angle of 16 to 24° to the circumferential direction of the tire 1.

The belt 8 provides a lateral rigidity so that a rise of tread 13 from a road surface is minimized during use of the tire 1.

Cords 11 and 12 of the belt 8 consist of steel cord, and have a 2+2 structure. However, cords may have any structure.

A cap ply 9 and an edge ply 14 are positioned on an upper portion of the belt part 8. A cap ply cord 15 in the cap ply 9 is positioned in parallel with the circumferential direction to suppress a size growth in the circumferential direction owing to high-speed revolution of the tire. According to the present invention, useful is the cap ply cord 15 having a high heat shrinkage stress at high temperature. Examples of the cap ply cord include organic fiber cord, such as PEN, rayon, and aramid, and a steel cord. Preferably, the cap ply cord is nylon.

In the present example, one layer of the cap ply 9 and one layer of the edge ply 14 are reinforced. But, it is preferable that 1 to 2 layers of the cap ply 9 and 1 to 2 layers of the edge ply 14 are reinforced.

205/60R15 91V tire produced through the present example is 9.9 kg in weight.

As described above, the present invention has advantages in that a process for expanding the tire after vulcanization (PCI) can be omitted during production of the tire, and RFV (Radial Force Variation) and LFV (Lateral Force Variation) of the tire of the present invention are improved by 55 to 100% in comparison with the conventional polyester cord tire, thereby uniformity is improved.

Other advantages are that time is not wasted and energy is saved during production of the tire, as well as a fatigue resistance is improved, and a structural integrity of the tire according to the present invention is excellent because a growth of the exterior radius is reduced by 10%.

It is thus seen that the objects set forth above, as made apparent from the preceding description, are efficiently attained and, since certain changes may be made in carrying out the above method and in the construction set forth without departing from the spirit and scope of the invention, it is intended that all matter contained in the accompanying drawing shall be interpreted as illustrative, and not in a limiting sense.

What is claimed is:

1. A radial tire for an automobile, wherein a lyocell cord is applied to a carcass part, said lyocell cord having a dry tenacity S1 of 4.0 to 5.5 g/d, a wet tenacity S2 of 3.0 to 4.5 g/d, a dry/wet tenacity ratio S1/S2 of 1.2 to 1.6, a tensile strength S3 at high temperatures which is more than 80% of a tensile strength S4 at room temperature, and a shrinkage E of less than 1%.

2. The radial tire for the automobile according to claim 1, wherein said lyocell cord has a total denier of 3000 to 5500 d, the twist number of 10 to 15 tpi, and a reinforcement density of 15 to 30 EPI.

3. A lyocell cord, having a dry tenacity S1 of 4.0 to 5.5 g/d, a wet tenacity S2 of 3.0 to 4.5 g/d, a dry/wet tenacity ratio S1/S2 of 1.2 to 1.6, a tensile strength S3 at high temperatures which is more than 80% of a tensile strength S4 at room temperature, and a shrinkage E of less than 1%.

* * * * *